(12) United States Patent
Dudar

(10) Patent No.: US 10,760,517 B2
(45) Date of Patent: Sep. 1, 2020

(54) SYSTEMS AND METHODS FOR CYLINDER EXHAUST VALVE DIAGNOSTICS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 15/863,796

(22) Filed: Jan. 5, 2018

(65) Prior Publication Data

US 2019/0211768 A1    Jul. 11, 2019

(51) Int. Cl.
*F02D 41/22* (2006.01)
*F02D 41/18* (2006.01)
*F02D 41/00* (2006.01)
*F02B 39/10* (2006.01)
*F02D 41/14* (2006.01)
(Continued)

(52) U.S. Cl.
CPC ............ *F02D 41/221* (2013.01); *F02B 39/10* (2013.01); *F02D 41/0007* (2013.01); *F02D 41/18* (2013.01); *F02D 41/22* (2013.01); *B60K 6/22* (2013.01); *B60W 20/50* (2013.01); *B60Y 2200/92* (2013.01); *F01N 3/021* (2013.01); *F01N 2560/08* (2013.01); *F01N 2900/1406* (2013.01); *F01N 2900/1411* (2013.01); *F02D 41/008* (2013.01); *F02D 41/1445* (2013.01); *F02D 41/26* (2013.01); *F02D 2200/0812* (2013.01); *G05D 1/021* (2013.01); *G07C 5/0808* (2013.01); *Y10S 903/904* (2013.01); *Y10S 903/93* (2013.01)

(58) Field of Classification Search
CPC ............... F02D 41/0007; F02D 41/008; F02D 41/1445; F02D 41/18; F02D 41/22; F02D 41/221; F02D 41/26; F02D 2200/0812; F02B 39/10; B60K 6/22; B60W 20/50; B60Y 2200/92; F01N 3/021; F01N 2900/1406; F01N 2900/1411; G05D 1/021; G07C 5/0808; Y10S 903/904; Y10S 903/93
See application file for complete search history.

(56) References Cited

U.S. PATENT DOCUMENTS 1,477,796 A * 12/1923 Zimmerman ....... G01M 3/2876
73/47
1,493,633 A * 5/1924 Joyce ..................... G01M 15/06
116/266
(Continued)

OTHER PUBLICATIONS

Dudar, A., "Systems and Methods for Diagnosing a Vehicle Engine Intake Manifold and Exhaust Systems," U.S. Appl. No. 15/657,655, filed Jul. 24, 2017, 68 pages.
(Continued)

*Primary Examiner* — David J Bolduc
(74) *Attorney, Agent, or Firm* — Geoffrey Brumbaugh; McCoy Russell LLP

(57) ABSTRACT

Methods and systems are provided for diagnosing degradation of an exhaust valve coupled to an engine cylinder. In one example, a method may include, routing compressed air from an electric booster into a cylinder with the intake valve of the cylinder open and the exhaust valve closed, and indicating degradation of the exhaust valve based on an exhaust airflow relative to a baseline airflow.

20 Claims, 7 Drawing Sheets

(51) Int. Cl.
*B60K 6/22* (2007.10)
*B60W 20/50* (2016.01)
*F01N 3/021* (2006.01)
*F02D 41/26* (2006.01)
*G05D 1/02* (2020.01)
*G07C 5/08* (2006.01)

(56) References Cited

U.S. PATENT DOCUMENTS

| | | | | | |
|---|---|---|---|---|---|
| 1,525,404 | A | * | 2/1925 | McConkey | G01M 3/2876 73/47 |
| 1,570,520 | A | * | 1/1926 | Oehrli | G01M 3/2876 285/143.1 |
| 2,003,949 | A | * | 6/1935 | Morgan | G01L 7/02 138/46 |
| 2,212,466 | A | * | 8/1940 | Bradford | G01L 23/00 73/47 |
| 2,328,289 | A | * | 8/1943 | Morgan | G01M 3/2876 73/47 |
| 2,625,033 | A | * | 1/1953 | Adair | G01M 3/26 73/47 |
| 2,679,753 | A | * | 6/1954 | Peter | G01L 23/02 73/114.13 |
| 2,811,852 | A | * | 11/1957 | Shuck | G01M 3/2876 73/47 |
| 3,100,988 | A | * | 8/1963 | Mansfield | G01L 27/00 73/114.18 |
| 3,115,033 | A | * | 12/1963 | Blowers | G01L 19/0007 73/756 |
| 3,224,260 | A | * | 12/1965 | Lankford | G01L 19/0007 73/756 |
| 3,320,801 | A | * | 5/1967 | Rhindress, Jr. | G01L 23/00 73/114.18 |
| 4,085,611 | A | * | 4/1978 | Schwartz | G01L 23/32 346/3 |
| 4,574,620 | A | * | 3/1986 | Cohl | G01M 3/26 73/47 |
| 4,625,545 | A | * | 12/1986 | Holm | G01M 3/002 374/4 |
| 4,686,851 | A | * | 8/1987 | Holm | G01M 3/3263 73/49.2 |
| 5,569,841 | A | * | 10/1996 | Hoban | G01M 3/025 73/114.16 |
| 5,624,239 | A | * | 4/1997 | Osika | F04F 5/20 15/409 |
| 5,795,995 | A | * | 8/1998 | Shimaoka | F02M 65/003 73/40 |
| 6,813,934 | B2 | * | 11/2004 | Kang | G01M 3/025 73/49.7 |
| 7,581,433 | B2 | | 9/2009 | Sellers | |
| 10,094,304 | B1 | * | 10/2018 | Dudar | F02D 41/18 |
| 10,337,440 | B1 | * | 7/2019 | Dudar | F02D 41/123 |
| 2006/0218993 | A1 | * | 10/2006 | Sellers | G01M 3/025 73/49.7 |
| 2006/0243040 | A1 | * | 11/2006 | Reed | F02D 41/221 73/114.79 |
| 2010/0175463 | A1 | * | 7/2010 | Doering | F02D 13/06 73/114.37 |
| 2014/0360477 | A1 | * | 12/2014 | Doering | F02D 41/221 123/673 |
| 2016/0032843 | A1 | * | 2/2016 | Ulrey | F02B 31/085 123/90.15 |
| 2016/0138526 | A1 | * | 5/2016 | Peters | F02M 26/52 123/559.1 |
| 2016/0332620 | A1 | * | 11/2016 | Dudar | F02M 25/089 |
| 2016/0341142 | A1 | * | 11/2016 | Taibi | F01N 11/002 |
| 2016/0363503 | A1 | * | 12/2016 | Matsukawa | G01M 3/3272 |
| 2017/0002761 | A1 | * | 1/2017 | Dudar | F02M 25/06 |
| 2017/0037786 | A1 | * | 2/2017 | Fabien | F02B 37/183 |
| 2017/0051698 | A1 | * | 2/2017 | Zielinski | F02B 75/18 |
| 2017/0067407 | A1 | * | 3/2017 | Dudar | F02D 41/3005 |
| 2017/0314442 | A1 | * | 11/2017 | Lipa | F01N 3/22 |
| 2018/0003122 | A1 | * | 1/2018 | Burkell | F02D 41/221 |
| 2018/0128145 | A1 | * | 5/2018 | Uhrich | F02D 41/26 |
| 2018/0171886 | A1 | * | 6/2018 | Ulrey | F01N 13/107 |
| 2018/0171887 | A1 | * | 6/2018 | Ulrey | F02D 13/0261 |
| 2018/0171899 | A1 | * | 6/2018 | Ulrey | F02D 41/025 |
| 2018/0171908 | A1 | * | 6/2018 | Ulrey | F02M 26/43 |
| 2018/0274471 | A1 | * | 9/2018 | Dudar | F01L 13/0005 |
| 2019/0017427 | A1 | * | 1/2019 | Dudar | F01N 11/002 |
| 2019/0024599 | A1 | * | 1/2019 | Dudar | F02D 41/22 |
| 2019/0033170 | A1 | * | 1/2019 | Dudar | F02D 41/221 |
| 2019/0048776 | A1 | * | 2/2019 | Van Nieuwstadt | F01N 1/168 |
| 2019/0048777 | A1 | * | 2/2019 | Rollinger | F01N 13/008 |
| 2019/0085758 | A1 | * | 3/2019 | Kurtz | F02D 41/0005 |
| 2019/0135270 | A1 | * | 5/2019 | Dudar | B60W 20/50 |
| 2019/0176810 | A1 | * | 6/2019 | Dudar | F01N 1/168 |
| 2019/0178190 | A1 | * | 6/2019 | Dudar | F01N 11/002 |
| 2019/0186401 | A1 | * | 6/2019 | Dudar | G07C 5/0816 |
| 2019/0195153 | A1 | * | 6/2019 | Dudar | F02M 26/08 |

OTHER PUBLICATIONS

Dudar, A., "Systems and Methods for Diagnosing a Vehicle Engine Intake Manifold and Exhaust Systems," U.S. Appl. No. 15/804,359, filed Nov. 6, 2017, 91 pages.

* cited by examiner

SYSTEMS AND METHODS FOR CYLINDER EXHAUST VALVE DIAGNOSTICS

FIELD

The present description relates generally to methods and systems for performing diagnostics of an exhaust valve coupled to a cylinder during a vehicle key-off condition.

BACKGROUND/SUMMARY

In a four-stroke cycle engine, power is recovered from the combustion process in four separate piston movements (strokes) of a single piston, including intake, compression, power, and exhaust strokes. During the intake stroke, the intake valve is opened to introduce air into the combustion chamber. Similarly, during the exhaust stroke, the exhaust valve is opened to allow exhaust to be released from the combustion chamber. During the compression and power strokes, the intake and exhaust valves are maintained closed, thus sealing the combustion chamber and maximizing compression during the compression stroke and efficiently transferring the energy resulting from combustion into piston movement in the power stroke. The exhaust gases flowing out of the cylinder via the exhaust valve include the by-products of combustion. Thus, over time, soot and other carbon materials may build up in the exhaust valve. As one example, the exhaust valve may become loaded with carbon buildup, which may in some examples cause the exhaust valve to exhibit degradation (e.g. stuck in at least a partially open position). If the combustion chamber is not sealed during the compression stroke, for example, a cylinder may lose most of its air/fuel mixture prior to ignition leading to combustion instability and misfire.

One example approach for conducting off-board cylinder leak test is shown by Sellers in U.S. Pat. No. 7,581,433. Sellers introduces an apparatus including a hose having an end configured for communication with a spark plug hole connecting to a cylinder to be tested and an end for attachment to a source of pressurized gas. Pressurized gas is routed into the cylinder and in-cylinder pressure is monitored to detect leaks in the cylinder.

However, the inventors herein have recognized potential issues with such systems. As one example, off-board diagnostic methods are required to be carried out by specialists, and it is additionally intrusive, difficult, and time consuming. The method described by Sellers may not be able to differentiate between a leak in the intake valve and a leak in the exhaust valve of the cylinder. A leak in the exhaust valve may adversely affect engine operation by causing misfires, backfires, rough idling, lower power output, and decreased fuel economy. If a cylinder is operated for a prolonged duration with a leaky exhaust valve, the high amount of heat released during combustion may further erode the valve.

In one example, the issues described above may be addressed by an engine method comprising: testing for degradation of an exhaust valve coupled to a cylinder of a multi cylinder engine, which drives a vehicle, by sealing the exhaust valve during an on-board test, routing compressed air into the cylinder during the test, and indicating presence or absence of degradation of the exhaust valve during the test based on an airflow through an exhaust coupled to the cylinders relative to a baseline airflow through the exhaust. In this way, by routing pressurized air through an engine cylinder during vehicle key-off conditions, it is possible to detect degradation of an exhaust valve coupled to the cylinder.

In one example, a diagnostic routine of a cylinder exhaust valve may be opportunistically carried out during vehicle key-off conditions when the engine is not operated. The vehicle may be an autonomous vehicle and/or a hybrid vehicle. The engine may be a boosted engine comprising a turbine driven intake air compressor and an electrically driven intake air compressor (herein also referred to as a battery operated electric booster) that is selectively operated for providing additional boost during increased torque demand. During on-board power distribution analysis, a cylinder may be identified to deliver a lower than threshold power. During an immediately subsequent vehicle key-off condition, the cylinder may be positioned with the intake valve open and the exhaust valve closed. The diagnostic routine for the exhaust valve includes, operating the electric booster to route pressurized air from the intake manifold to the exhaust manifold via the cylinder. Airflow exiting the cylinder may be compared to a threshold airflow and the exhaust valve may be diagnosed to be degraded based on a higher than threshold exhaust airflow. Subsequent engine cylinders of the multi cylinder engine may be similarly diagnosed to detect degradation of the respective exhaust valves.

In this way, by opportunistically using existing engine components, such as an electric booster and a differential pressure sensor, the need for off-board intervention and use of additional sensors and/or equipment for diagnostics of an exhaust valve may be reduced. The technical effect of carrying out diagnostics of the exhaust valve during vehicle key-off conditions is that the diagnostics of the exhaust valve may be carried out while maintaining the engine valves in a static position and without affecting engine performance. By identifying a cause for lower than threshold power output in a particular cylinder, suitable mitigating steps may be taken, thereby reducing the possibility of engine system degradation. Overall, by regularly monitoring the health of exhaust valves, combustion stability, engine performance, and fuel efficiency may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
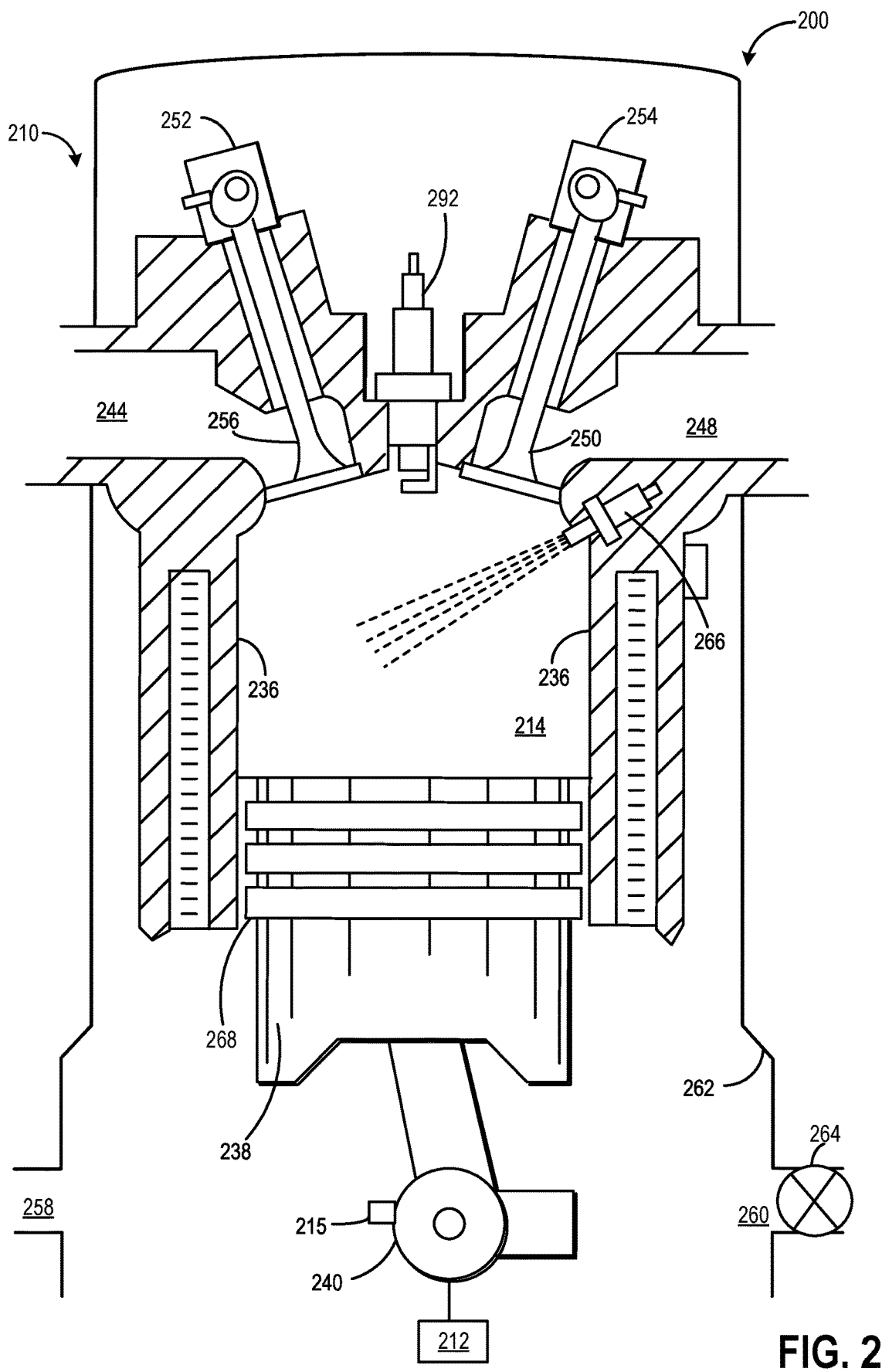
FIG. 2 shows a schematic description of one cylinder of the multi-cylinder engine.
Figure 3:
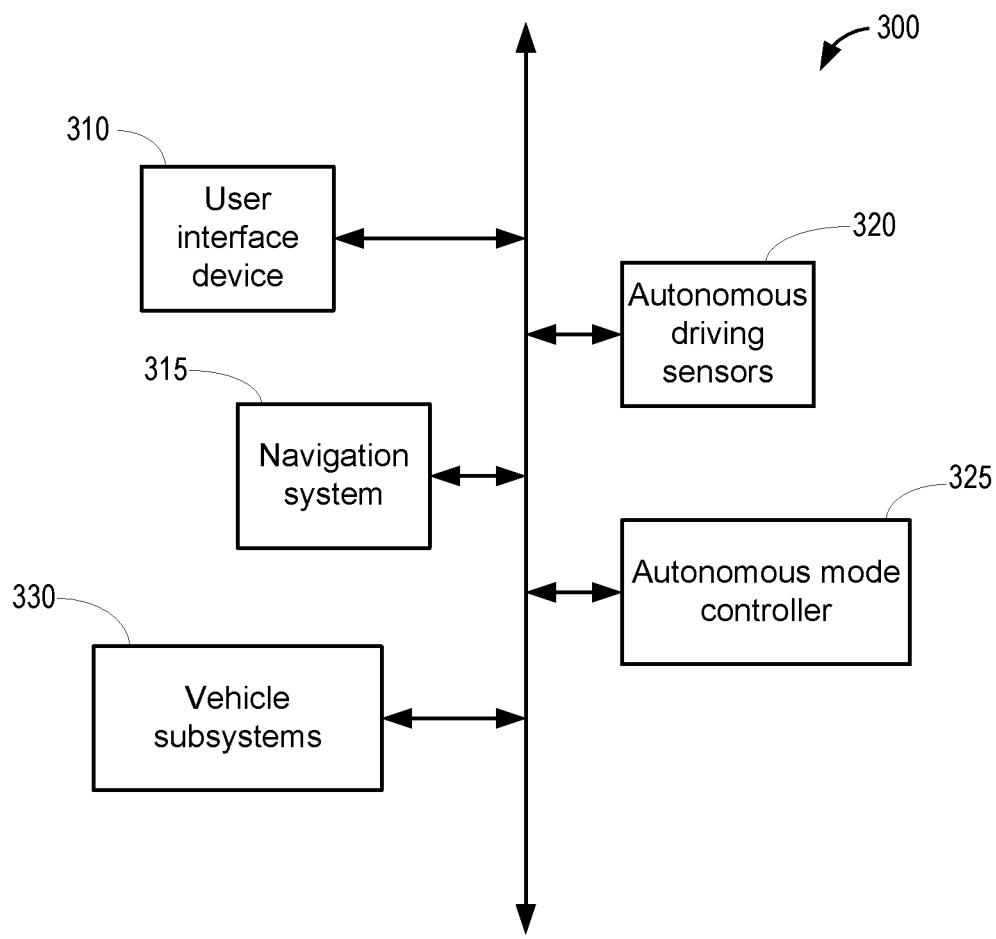
FIG. 3 schematically illustrates a block diagram of an example autonomous driving system.
Figure 4:
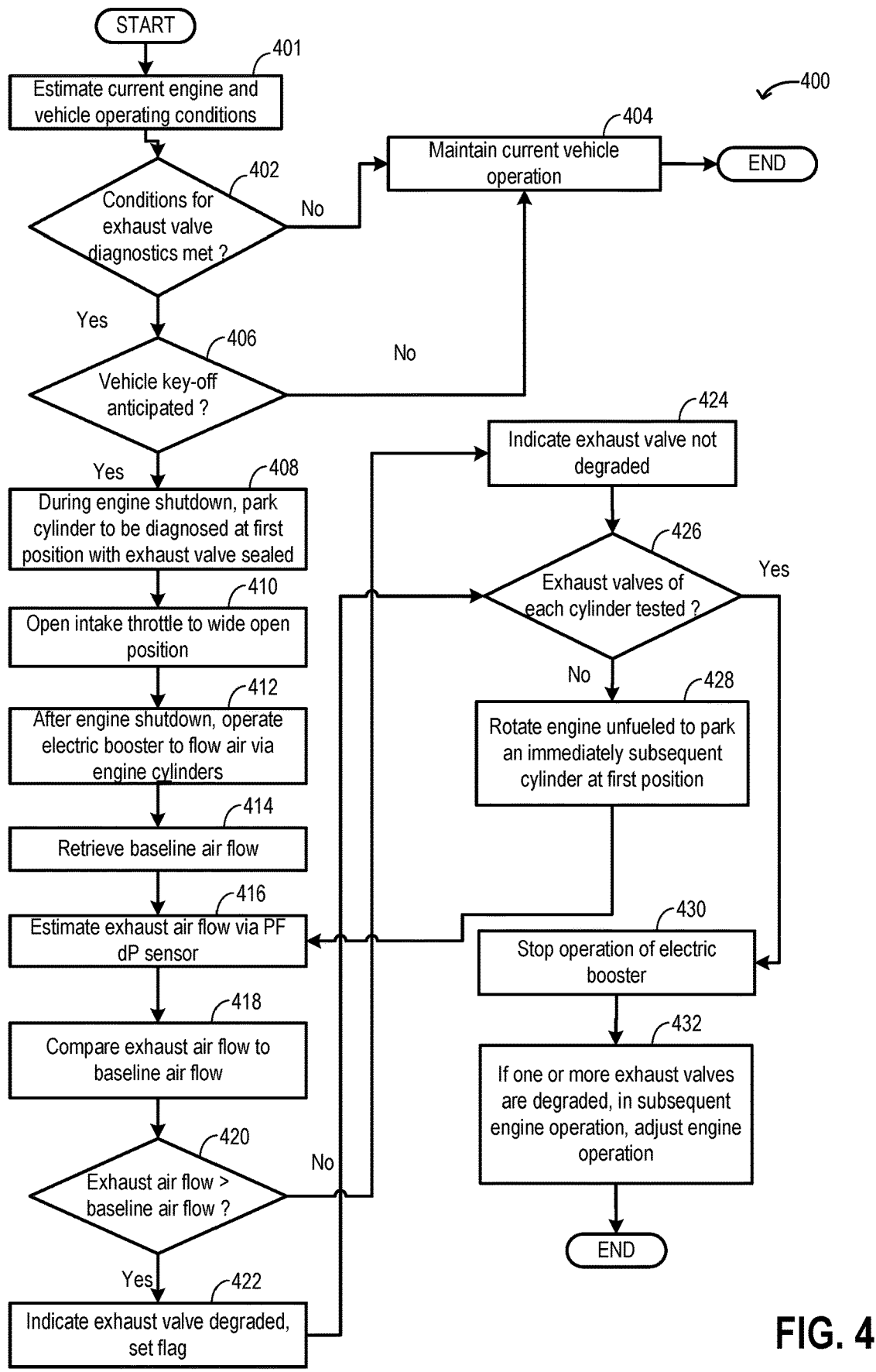
FIG. 4 shows a flow chart illustrating an example method that can be implemented to diagnose degradation of an exhaust valve.
Figure 5:
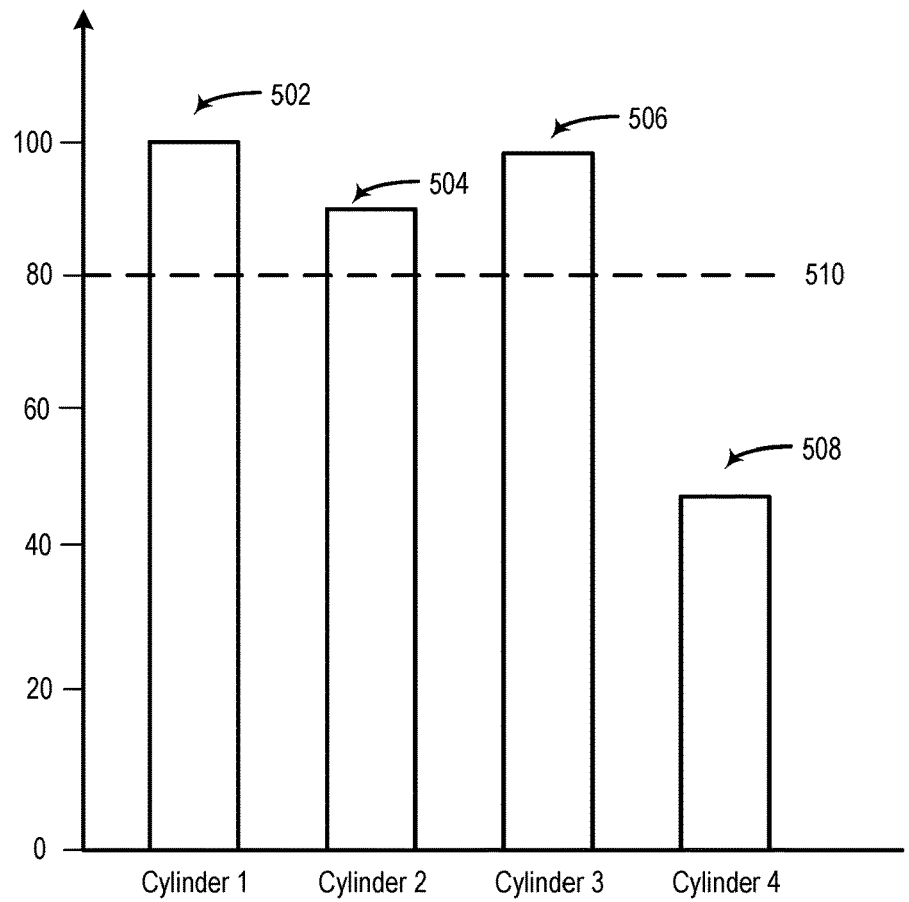
FIG. 5 shows an example plot of cylinder power.
Figure 6:
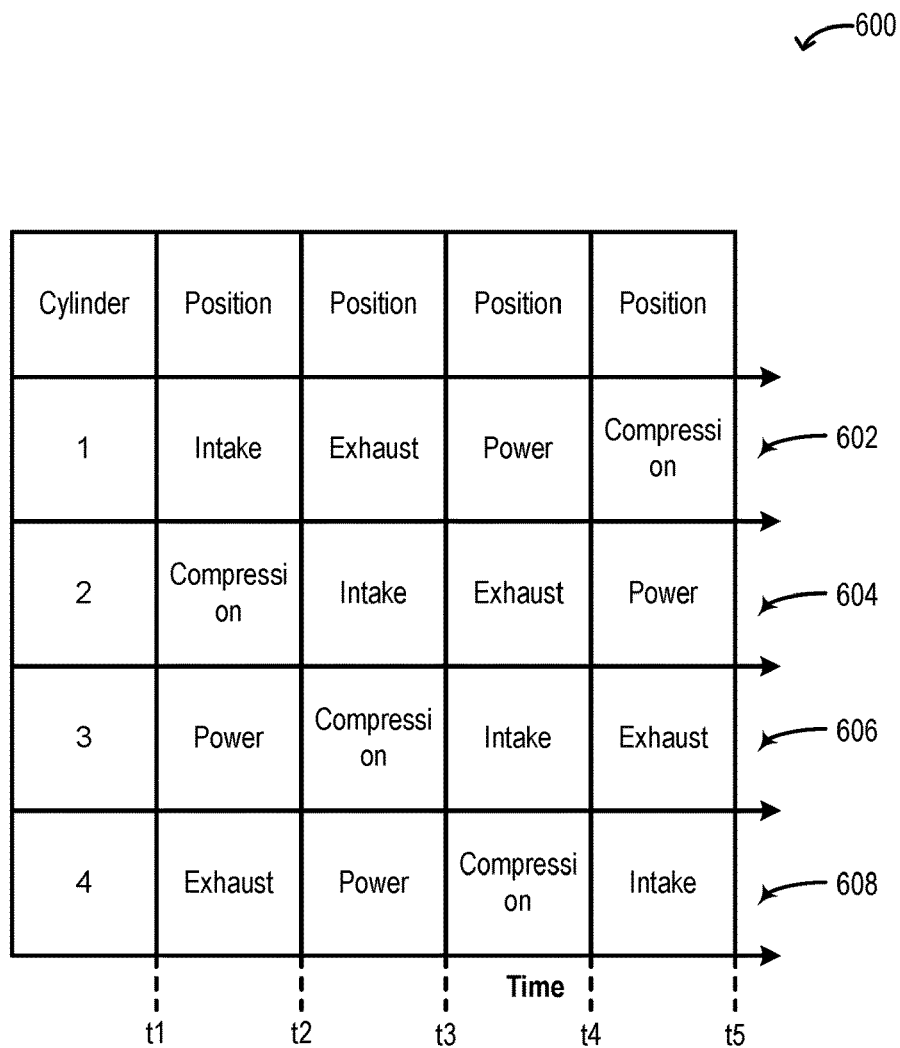
FIG. 6 shows an example timeline of engine positions during the exhaust valve diagnostics routine.
Figure 7:
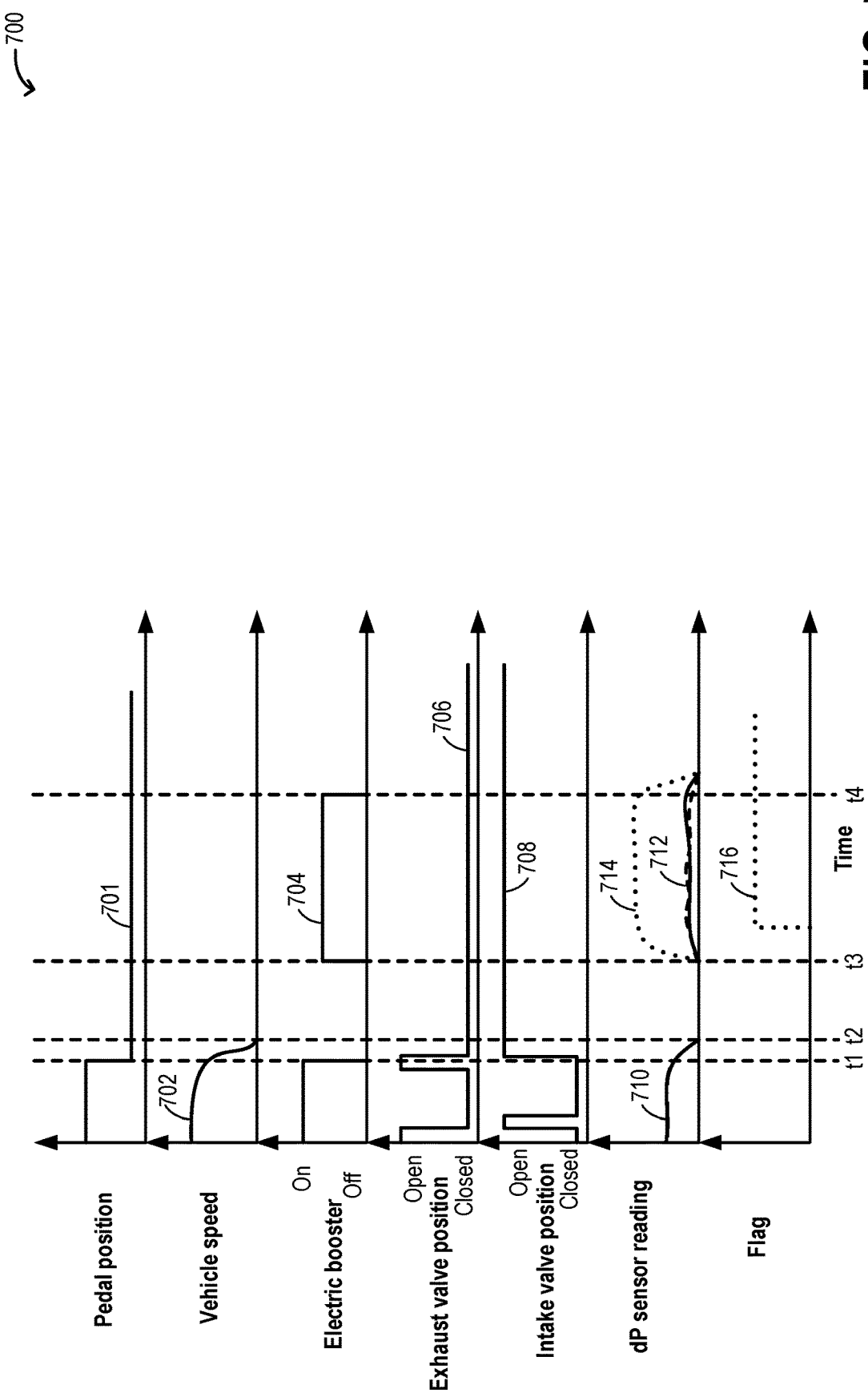
FIG. 7 shows an example operation of the electric booster for exhaust valve diagnostics, according to the present disclosure.

The following description relates to systems and methods for diagnostics of an exhaust valve coupled to an engine cylinder, during vehicle-off conditions. Such methods may include flowing compressed air through engine cylinders, such as the cylinders coupled to the hybrid vehicle system depicted in FIG. 1. An example cylinder including an exhaust valve is shown in FIG. 2. Exhaust valve diagnostics may in some examples be carried out in an autonomous vehicle, where FIG. 3 depicts an example autonomous vehicle control system. An engine controller may be configured to perform a control routine, such as the example routine of FIG. 4, to diagnose degradation of the exhaust tuning valve. An engine cylinder may be identified for carrying out exhaust valve diagnostics based on the power delivered by the cylinder, as shown in the plot of FIG. 5. Example electric booster operations and engine positions to enable exhaust valve diagnostics are shown in FIGS. 6-7.

Figure 1:
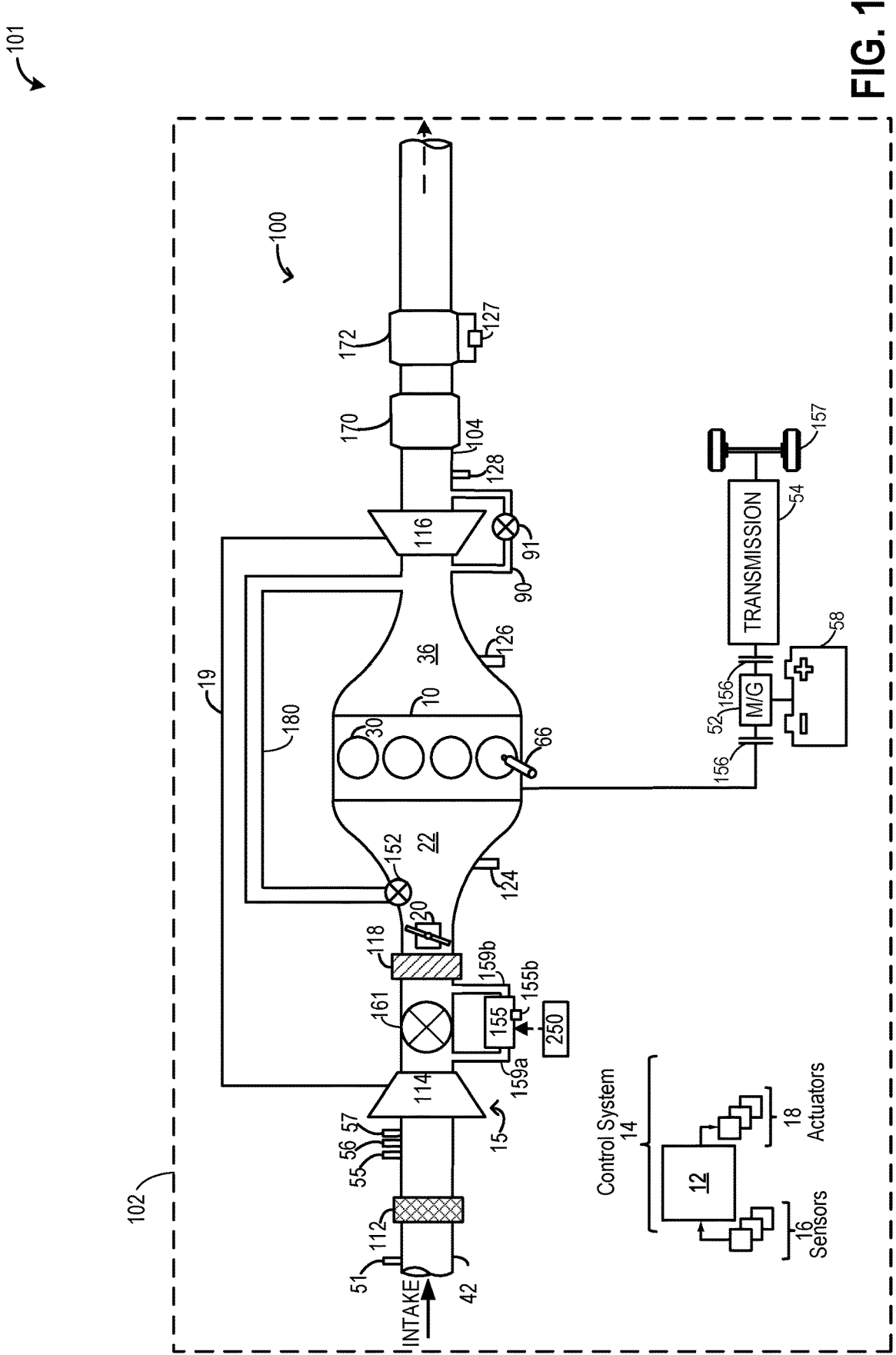
FIG. 1 schematically shows an example hybrid vehicle system with multi-cylinder engine.

FIG. 1 shows a schematic view 101 of a vehicle system 102 with an example engine system 100 including an engine 10. In one example, the engine system 100 may be a diesel engine system. In another example, the engine system 100 may be a gasoline engine system. In the depicted embodiment, engine 10 is a boosted engine coupled to a turbocharger 15 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 22. In the embodiment shown in FIG. 1, the pressure of the air charge within the intake manifold 22 is sensed by manifold air pressure (MAP) sensor 124. Temperature of ambient air entering the intake passage 42 may be estimated via an intake air temperature (IAT) sensor 51.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, an ambient humidity sensor 57 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 91 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

To assist the turbocharger 15, an additional intake air compressor, herein also referred to as an electric booster 155 may be incorporated into the vehicle propulsion system. Electric booster 155 may be powered via an onboard energy storage device 250, which may comprise a battery, capacitor, supercapacitor, etc. The electric booster may include a compressor driven by an electric motor. A speed of operation of the electric booster may include adjusting a speed of operation of the electric motor, the electric motor operated via the on-board energy storage device 250.

In one example, electric booster 155 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric booster was not available. In such an example, responsive to the turbocharger spooling up to a threshold speed (e.g. 70,000 rpm), the electric booster 155 may be actuated off, or deactivated. More specifically, operational control of the electric booster 155 may be achieved based on command signals (e.g. duty cycle or pulse width signals) received from the vehicle controller (e.g. controller 12). For example, the controller may send a signal to an electric booster actuator 155b, which may actuate on the electric booster. In another example, the controller may send a signal to the electric booster actuator 155b, which may actuate off the electric booster. In one example the electric booster actuator may comprise an electric motor which drives the compression of air.

Electric booster 155 may be positioned between a first electric booster conduit 159a, and a second electric booster conduit 159b. First electric booster conduit 159a may fluidically couple intake passage 42 to electric booster 155 upstream of electric booster bypass valve 161. Second electric booster conduit 159b may fluidically couple electric booster 155 to intake passage 42 downstream of electric booster bypass valve 161. As an example, air may be drawn into electric booster 155 via first electric booster conduit 159a upstream of electric booster bypass valve 161, and compressed air may exit electric booster 155 and be routed via second electric booster conduit to intake passage 42 downstream of electric booster bypass valve 161. In this way, compressed air may be routed to engine intake 22.

In circumstances where the electric booster 155 is activated to provide boost more rapidly than if the turbocharger 15 were solely relied upon, it may be understood that electric booster bypass valve 161 may be commanded closed while electric booster 155 is activated. In this way, intake air may flow through turbocharger 15 and through electric booster 155. Once the turbocharger reaches the threshold speed, the electric booster 155 may be turned off, and the electric booster bypass valve 161 may be commanded open.

Intake manifold 22 is coupled to a series of combustion chambers 30 through a series of intake valves (not shown). The combustion chambers are further coupled to exhaust manifold 36 via a series of exhaust valves (not shown). An example combustion chamber (cylinder) is described in details in relation to FIG. 2. In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

As combustion is carried out in the engine cylinders, the exhaust valve may become loaded with carbon buildup, which may cause the exhaust valve to be stuck in a partially or completely open position. In one example, upon indication that a power output of a first cylinder is lower than a threshold power output, diagnostics of the exhaust valve coupled to the first cylinder may be carried out during a subsequent engine non-combusting condition. In one example, power output of the first cylinder may be estimated by selectively disabling spark to the first cylinder while maintaining spark to each remaining cylinders of the multi cylinder engine, estimating a change in engine speed via a crankshaft position sensor, and estimating the power output of the first cylinder based on the estimated change in the engine speed after disabling spark. During the diagnostics, the cylinder may be parked in a first position with an intake valve, coupled to the cylinder, in an open position and the exhaust valve in a closed position. Compressed air from an engine intake manifold 22 may be forced into the cylinder by operating the electric booster 155 via an electric booster actuator 155b. An exhaust airflow may be estimated via the differential pressure sensor 127 and compared to a baseline airflow. The exhaust valve may be indicated to be degraded responsive to the estimated exhaust airflow being higher than the baseline airflow. The exhaust valve may be indicated to be not degraded responsive to the estimated exhaust airflow being substantially equal to the baseline airflow (such as within 5% of the baseline airflow). During an immediately subsequent engine operation, in response to indication of a degraded exhaust valve, fueling and spark to the cylinder with the degraded exhaust valve may be suspended.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections may be directed to turbine 116 to drive the turbine. The combined flow from the turbine and the wastegate then flows through emission control device 170. In one example, the emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together.

A gasoline particulate filter (GPF) 172 may be coupled to the exhaust passage 104 downstream of the exhaust after-treatment device 170. GPF 172 may comprise a particulate filter, hydrocarbon trap, a catalyzed wash coat, or combination thereof. In some examples, during operation of engine, GPF 172 may be periodically regenerated by operating at least one cylinder of the engine within a particular air-fuel ratio to increase a temperature of GPF 172, such that retained hydrocarbons and soot particles may be oxidized.

Pressure in the exhaust system may be assessed by pressure sensor 127. Pressure sensor 127 may be a differential pressure sensor coupled across GPF 172, for example. Pressure sensor 172 may be used to determine airflow at the inlet of GPF 172 in order to assess operating conditions for air to be introduced to the inlet of GPF 172 for regeneration.

Exhaust gas recirculation (EGR) delivery passage 180 may be coupled to the exhaust passage 104 upstream of turbine 116 to provide high pressure EGR (HP-EGR) to the engine intake manifold, downstream of compressor 114. An EGR valve 152 may be coupled to the EGR passage 181 at the junction of the EGR passage 180 and the intake passage 42. EGR valve 152 may be opened to admit a controlled amount of exhaust to the compressor outlet for desirable combustion and emissions control performance. EGR valve 152 may be configured as a continuously variable valve or as an on/off valve. In further embodiments, the engine system may include a low pressure EGR (LP-EGR) flow path wherein exhaust gas is drawn from downstream of turbine 116 and recirculated to the engine intake manifold, upstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors coupled to the compressor inlet.

A plurality of sensors, including an exhaust temperature sensor 128, an exhaust oxygen sensor, and an exhaust flow sensor may be coupled to the main exhaust passage 104. The oxygen sensor may be linear oxygen sensors or UEGO (universal or wide-range exhaust gas oxygen), two-state oxygen sensors or EGO, HEGO (heated EGO), a NOx, HC, or CO sensors.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the turbine 116, MAP sensor 124, exhaust temperature sensor 128, exhaust pressure sensor 127, compressor inlet temperature sensor 55, compressor inlet pressure sensor 56, ambient humidity sensor 57, IAT sensor 51, engine coolant temperature sensor, and EGR sensor. Other sensors such as additional pressure, temperature, air/fuel ratio, and composition sensors may be coupled to various locations in engine system 100. In addition, sensors coupled to the exterior of the vehicle system such as the rain sensor (windshield sensor) 130 may be used to estimate ambient humidity.

The actuators 18 may include, for example, electric booster bypass valve 161, throttle 20, electric booster actuator 155b, EGR valve 152, wastegate 92, and fuel injector 66. The control system 14 may include a controller 12. The controller 12 may receive input data from the various sensors, process the input data, and trigger various actuators in response to the processed input data based on instruction or code programmed therein corresponding to one or more routines. In one example, in response to a lower than threshold power output from a cylinder, in anticipation of a vehicle key-off condition, the controller may position the cylinder with its intake valve open and the exhaust valve closed and the controller 12 may send a signal to each of the electric booster bypass valve 161 to actuate the valve to a closed position, and to the booster actuator 155b to actuate the electric booster 155 to route compressed air through the cylinder. During routing the compressed air through the cylinder, degradation of the exhaust valve coupled to the cylinder may be diagnosed based on a change in exhaust pressure as estimated via the pressure sensor 127.

In some examples, vehicle 102 may be a hybrid vehicle with multiple sources of torque available to one or more vehicle wheels 157. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft of engine 10 and electric machine 52 are connected via a transmission 54 to vehicle wheels 157 when one or more clutches 156 are engaged. In the depicted example, a first clutch 156 is provided between crankshaft and electric machine 52, and a second clutch 156 is provided between electric machine 52 and transmission 54. Controller 12 may send a signal to an actuator of each clutch 156 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge traction battery 58, for example during a braking operation.

FIG. 2 depicts an example embodiment 200 of a combustion chamber or cylinder that may be included in engine 210, which may be configured similarly to engine 10 as described herein, and depicted in FIG. 1. Cylinder (i.e. combustion chamber) 214 may include combustion chamber walls 236 with piston 238 positioned therein. Piston 238 may include one or more piston rings 268. The one or more piston rings 268 may function to seal cylinder 214, to assist with piston heat transfer, and to regulate oil consumption, for example. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor 212 may be coupled to crankshaft 240 via a flywheel to enable a starting operation of engine 210, and/or to rotate the engine in an unfueled mode. A crankshaft position sensor 214 may be coupled to the crankshaft 240 to estimate engine speed.

Cylinder 214 can receive intake air via intake air passage 244, which may be one of a plurality of intake air passages coupled to cylinder 214. Intake air passage 244 may communicate with other cylinders of engine 210 in addition to cylinder 214. In some embodiments, one or more of the intake passages may include a boosting device such as a turbocharger or a supercharger. Exhaust passage 248 can receive exhaust gases from cylinder 214 as well as from other cylinders of engine 210.

Each cylinder of engine 210 may include one or more intake valves and one or more exhaust valves. For example, cylinder 214 is shown including at least one intake poppet valve 256 and at least one exhaust poppet valve 250 located at an upper region of cylinder 214. In some embodiments, each cylinder of engine 210, including cylinder 214, may include at least two intake poppet valves and at least two exhaust poppet valves located at an upper region of the cylinder.

Intake valve 256 may be controlled by a controller via actuator 252. Similarly, exhaust valve 250 may be controlled by a controller via actuator 254. During some conditions, the controller may vary the signals provided to actuators 252 and 254 to control the opening and closing of the respective intake and exhaust valves. The position of intake valve 256 and exhaust valve 250 may be determined by respective valve position sensors (not shown). The valve actuators may be of the electric valve actuation type or cam actuation type, or a combination thereof, as described with reference to FIG. 1. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by a controller to vary valve operation. For example, cylinder 214 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 214 can have a compression ratio, which is the ratio of volumes within the cylinder between when piston 238 is at bottom center and at top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 210 may include a spark plug 292 for initiating combustion. An ignition system (not shown) can provide an ignition spark, or multiple ignition sparks, to cylinder 214 via spark plug 292 in response to a spark advance signal from a controller, under select operating modes. However, in some embodiments, spark plug 292 may be omitted, such as where engine 210 may initiate combustion by auto-ignition as may be the case with some diesel engines.

In some embodiments, each cylinder of engine 210 may be configured with one or more fuel injectors for providing fuel thereto. As a non-limiting example, cylinder 214 may include two fuel injectors (e.g., a port fuel injector and a direct fuel injector). Fuel injector 266 is shown coupled directly to cylinder 214 for injecting fuel directly therein in proportion to a pulse width of a signal received from a controller via an electronic driver. In this manner, fuel injector 266 provides what is known as direct injection (hereafter referred to as "DI") of fuel into cylinder 214. While FIG. 2 shows injector 266 as a side injector, it may also be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 266 from a high pressure fuel system including a fuel tank, fuel pumps, a fuel rail, etc. Alternatively, fuel may be delivered by a single stage fuel pump at lower pressure, in which case the timing of the direct fuel injection may be more limited during the compression stroke than if a high pressure fuel system is used.

Fuel may be delivered to the cylinder during a single cycle of the cylinder. Directly injected fuel may be delivered during an intake stroke as well as partly during a previous exhaust stroke. Further, the direct injected fuel may be delivered as a single injection or as multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

A positive crackcase ventilation (PCV) system, may be coupled to the engine intake so that gasses in the crankcase 262 may be vented in a controlled manner from the crankcase. As described for PCV system 16 with reference to FIG. 1, engine 210 may include a crankcase ventilation tube 258, and a PCV line 260 in order to vent gasses out of the crankcase 262 and into intake manifold. In some examples PCV line 260 may include PCV valve 264, which may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

As described above, FIG. 2 shows only one cylinder of a multi-cylinder engine. As such each cylinder may similarly include its own set of intake/exhaust valves, fuel injector(s), spark plug, piston rings, etc.

A common failure mode in internal combustion engines is misfire. Typical causes of misfire include leaky or plugged fuel injectors, fouled spark plugs, degraded ignition coils, poor cylinder compression, etc. Misfire due to poor cylinder compression may be indicated by an onboard power balance test that runs with the engine combusting and which computes RPM contribution of each cylinders power stroke using the crankshaft position sensor 215 as input. Another test to indicate poor cylinder compression is the relative compression test. The relative compression test, for which prior art methods exist, uses a high amperage current probe to measure battery current during a crank event, as a cylinder with poor compression will not draw as much current as healthy cylinders. However, diagnosis as to the cause of poor cylinder compression, for example leaky cylinder valve (s) is typically performed by an offboard cylinder leakdown test involving the disabling of fuel flow to the cylinder, removal of spark plugs, installation of a pressure gage, and introduction of air into the cylinder. For example, the misfiring cylinder may be placed at top dead center (TDC) with both intake and exhaust valves closed, such that the escape of the introduced air indicates leaky intake or exhaust valves, or leaky piston rings. As this offboard cylinder leakdown test is intrusive, difficult, and time consuming, an onboard cylinder leakdown test is desirable to diagnose the cause of cylinder misfire due to poor compression. FIG. 4 describes a non-intrusive on-board test to detect degradation of the exhaust valve which may result in reduced power output from a cylinder or cause misfires.

Diagnostic routines for the exhaust valve may be conducted in a vehicle configured as an autonomous vehicle and an example autonomous driving system is discussed below with regard to FIG. 3. FIG. 3 is a block diagram of an example autonomous driving system 300 that may operate the vehicle system 100, described above at FIG. 1. Herein, the vehicle system 100 will be referred to simply as a "vehicle". The autonomous driving system 300, as shown, includes a user interface device 310, a navigation system 315, at least one autonomous driving sensor 320, and an autonomous mode controller 325. It may be understood that the onboard navigation system 315 may be the same as the onboard navigation system 132 depicted at FIG. 1 and the user interface device 310 may be the same as the HMI 133 depicted at FIG. 1.

The user interface device 310 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 310 may be configured to receive user inputs. Thus, the user interface device 310 may be located in the passenger compartment (not shown) of the vehicle. In some possible approaches, the user interface device 310 may include a touch-sensitive display screen.

The navigation system 315 may be configured to determine a current location of the vehicle using, for example, a Global Positioning System (GPS) receiver configured to triangulate the position of the vehicle relative to satellites or terrestrial based transmitter towers. The navigation system 315 may be further configured to develop routes from the current location to a selected destination, as well as display a map and present driving directions to the selected destination via, for example, the user interface device 310.

The autonomous driving sensors 320 may include any number of devices configured to generate signals that help navigate the vehicle. Examples of autonomous driving sensors 320 may include a radar sensor, a lidar sensor, a vision sensor (e.g. a camera), vehicle to vehicle infrastructure networks, or the like. The autonomous driving sensors 320 may enable the vehicle to "see" the roadway and vehicle surroundings, and/or negotiate various obstacles while the vehicle 100 is operating in autonomous mode. The autonomous driving sensors 320 may be configured to output sensor signals to, for example, the autonomous mode controller 325.

The autonomous mode controller 325 may be configured to control one or more subsystems 330 while the vehicle is operating in the autonomous mode. Examples of subsystems 330 that may be controlled by the autonomous mode controller 325 may include a brake subsystem, a suspension subsystem, a steering subsystem, and a powertrain subsystem. The autonomous mode controller 325 may control any one or more of these subsystems 330 by outputting signals to control units associated with subsystems 330. In one example, the brake subsystem may comprise an anti-lock braking subsystem, configured to apply a braking force to one or more of wheels. Discussed herein, applying the braking force to one or more of the vehicle wheels may be referred to as activating the brakes. To autonomously control the vehicle, the autonomous mode controller 325 may output appropriate commands to the subsystems 330. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

In this way, the components of FIGS. 1-3 enable a system for a vehicle comprising: a vehicle, including an autonomous vehicle and/or a hybrid vehicle, an engine propelling the vehicle, the engine including a first cylinder, an intake passage, and an exhaust passage, the first cylinder including an intake valve and an exhaust valve, the intake valve actuated via an intake cam actuation system and the exhaust valve actuated via an exhaust cam actuation system, a conduit coupled to the intake passage downstream of a compressor and upstream of a CAC, the conduit including a motor-driven electric booster, a particulate filter coupled to the exhaust passage, a differential pressure sensor coupled across the particulate filter, and a controller with computer readable instructions stored on non-transitory memory for: during operation of the electric booster while the vehicle is in a keyed-off condition, commanding the intake cam actuation system and the exhaust cam actuation system to park the first cylinder in a first position with the intake valve open and the exhaust valve closed, sensing exhaust airflow in the exhaust passage via the differential pressure sensor after the commanded parking of the first cylinder, and indicating that the exhaust valve is leaking in response to the sensed exhaust airflow being higher than a threshold airflow.

FIG. 4 shows an example method 400 that may be implemented for detecting any degradation of an exhaust valve (such as exhaust valve 250 in FIG. 2) coupled to an engine cylinder (such as cylinder 214 in FIG. 2). Instructions for carrying out method 400 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 401, current engine and vehicle operating conditions may be estimated, measured, and/or inferred. Operating conditions may include one or more vehicle conditions, such as vehicle speed, vehicle location, etc., various engine conditions, such as engine status, engine load, engine speed, A/F ratio, fuel economy, etc., various fuel system conditions, such as fuel level, fuel type, fuel temperature, etc., various evaporative emissions system conditions, as well as various ambient conditions, such as ambient temperature, humidity, barometric pressure, etc.

At 402, the routine includes determining if conditions are met for carrying out exhaust valve diagnostics on one or more engine cylinders. In one example, the conditions may include an on-board cylinder power balance test identifying one or more cylinders contributing a lower than threshold engine power. A power balance test may be carried out in response to detection of engine operating conditions such as misfires, backfires, rough idle, decreased fuel economy etc. A cylinder misfire event may be detected based on one or more of crankshaft acceleration, exhaust air-fuel ratio, output of an exhaust gas oxygen sensor, and spark plug ionization (e.g., ionization current as determined by an ionization sensor coupled to the spark plug). As another example, the controller may monitor an engine misfire rate over a predetermined duration (e.g., time or number of engine cycles) of engine operation or predetermined distance of vehicle travel such that the misfire rate may be compared to a threshold rate. A threshold rate may be determined, for example, based on the engine's misfire history. In some embodiments, indicating the cylinder responsible for a misfire event may be determined based on cylinder firing order.

In a power balance test, while the engine is operating, the controller may selectively disable spark in a first engine cylinder to temporarily stop combustion in that cylinder while maintain fueling and spark in each of the remaining engine cylinders. As combustion is stopped in the first cylinder, there is a corresponding drop in engine speed as estimated via the crankshaft position sensor. The controller may then resume spark in the first cylinder and disable spark in the next cylinder to estimate the corresponding change in engine speed. The controller may monitor the change in engine speed after temporarily suspending combustion in each cylinder (one at a time). If the drop in engine speed corresponding to each engine cylinder is substantially equal (such as within 5% of one another), it may be inferred that each cylinder is equally contributing to the total engine power. In one example, the percentage of power delivered by a cylinder may be estimated using equation 1.

$$P = \frac{T-y}{T} \times 100 \qquad (1)$$

wherein P is the percentage power delivered by a cylinder, T is a threshold drop in engine speed upon suspension of combustion in a cylinder, and y is the estimated drop in engine speed upon suspension of combustion in the cylinder. The threshold drop in engine speed upon suspension of combustion in a cylinder may be calibrated immediately after an engine installation or servicing event at a manufacturing facility or a service center.

FIG. 5 shows an example plot 500 of power delivered by each cylinder of a four cylinder engine, as estimated by carrying out a cylinder power balance test. The y-axis shows the percentage of power delivered by each cylinder (as estimated using equation 1) of a four cylinder engine. Bar chart 502 shows the percentage power delivered by a first cylinder in the cylinder bank. Similarly, bar charts 504, 506, and 508 show the respective percentage power delivered by the second, third, and fourth cylinder in the cylinder bank. Dashed line 510 shows a threshold percentage power below which it may be inferred that there may be carbon build up on the exhaust valve of the cylinder causing the exhaust valve to leak, and the exhaust valve diagnostic routine may be carried out for the cylinder. The threshold percentage 510 may be a pre-determined non-zero threshold valve.

In the example plot 500, the first, second, and third cylinders deliver a higher than threshold engine power, thereby implying that the exhaust valves corresponding to each of these cylinders may not be leaking. However, the fourth cylinder shows a lower than threshold power output. Therefore, exhaust valve diagnostics may be carried out for the fourth cylinder to detect if the fourth cylinder is leaking.

Conditions being met for carrying out exhaust valve diagnostics on a particular engine cylinders may additionally or alternatively include an indication that a threshold duration (e.g. 1 day, 2 days, 5 days, 10 days, 15 days, greater than 20 days but less than 30 days, etc.) has elapsed since a prior exhaust valve diagnostic on the cylinder.

In another example, the exhaust valve diagnostics may be carried out during an autonomous vehicle mode when the vehicle is operated without a human driver and when the vehicle is not being propelled by engine torque. The vehicle operation may be controlled from a remote location or may be pre-programmed in the controller memory. During vehicle operation in the autonomous mode, the diagnostics may be opportunistically carried out immediately upon completion of a drive cycle.

If it is determined that the conditions are not met for carrying out a exhaust valve diagnostic routine on any engine cylinder, at 404, current vehicle operation may be maintained. In one example, an electric booster (such as electric booster 155 in FIG. 1) may be operated as required to provide boost assist during an increased torque demand. The electric booster may be coupled to a conduit parallel to an intake passage, the conduit coupled to the intake passage downstream of an intake compressor and upstream of a charge air cooler. During conditions when the boost pressure provided by operating the turbocharger (such as intake compressor 114 and exhaust turbine 116 in FIG. 1) is lower than a desired boost pressure, the electric booster may be operated using energy from an onboard energy storage device (such as energy storage device 250 in FIG. 1) to provide the desired boost. The speed and duration of operation of the electric booster may be adjusted based on turbocharger speed, and torque demand as estimated via a pedal position sensor. In one example, the speed and duration of operation of the electric booster may be increased with an increase in the torque demand and a decrease in turbocharger speed. In another example, the speed and duration of operation of the electric booster may be decreased with a decrease in the torque demand and an increase in turbocharger speed.

If it is determined that conditions are met for carrying out exhaust valve diagnostics on at least one engine cylinder, at 406, the routine may include determining if a vehicle key-off condition is anticipated. In one example, anticipating a key-off condition may include a tip-out event of the accelerator pedal followed by application of brakes to stop the vehicle (reduce the vehicle speed to zero) from bring propelled. In addition, in anticipation of the vehicle key-off, the transmission may be shifted to park. Also, the ignition switch may be turned off.

If it is determined that a vehicle key-off condition is not anticipated, the exhaust valve diagnostics may be postponed until the next vehicle key-off condition. Current vehicle operating conditions may be continued. If it is determined that a vehicle key-off condition is anticipated, it may be inferred that the engine may be shut down. The controller may send signals to the fuel injectors and to the spark plugs coupled to the engine cylinders to suspend fueling and spark, respectively. At 408, during the engine shut-down, the controller may send a signal to the cam actuators coupled to the intake and exhaust valves of the cylinders to park a first cylinder housing the exhaust valve that is to be diagnosed at a pre-determined first position. In the first position, the intake valve of the first cylinder may be in a completely open position while the exhaust valve of the first cylinder (to be diagnosed) may be in a completely closed position. In one example, the first position may include parking the first cylinder in an intake stroke between the top dead center (TDC) position and the bottom dead center (BDC) position. In a four cylinder engine, if the first cylinder is parked in the first position (in intake stroke), the second cylinder, immediately subsequent to the first cylinder may be in a compression stroke with each of the intake valve and the exhaust valve closed, the next (third) cylinder may be in the power stroke with each of the intake valve and the exhaust valve closed, and the last (fourth) cylinder may be in an exhaust stroke with the intake valve closed and the exhaust valve open. In this way, by parking the first cylinder in the first position, the intake valve of only one cylinder of the engine is held open during the diagnostic routine. In one example, the controller may send a signal to a starter motor (such as starter motor 212 in FIG. 2) coupled to the crankshaft to crank the engine after fueling and spark has been suspended until the first cylinder reaches the first position and then the operation of the starter motor may be suspended (as the first cylinder is parked in the first position). At 410, the controller may send a signal to the actuator coupled to the intake throttle plate to open the intake throttle to a wide open position in order to allow a highest possible amount of ambient air to enter the engine intake manifold.

Once the engine is shut-down, at 414, the electric booster may be operated to route compressed air from the intake manifold to the exhaust manifold via the first engine cylinder. As an example, with the cylinders are parked in the first position, only the intake valve of the first cylinder is open while the intake valve of the remaining there cylinders may be closed. The EGR valve may be closed to reduce airflow via the EGR passage. The controller may send a signal to the electric booster actuator (such as actuator 155b in FIG. 1) to actuate the electric booster using energy from the energy storage device coupled to the electric booster. As the ambient air entering the intake manifold flows through the electric booster, the air is pressurized (compressed). The pre-determined speed of rotation of the electric booster during the diagnostic routine may be lower than the speed of rotation of the electric booster when operated to compensate for the lag of the mechanical turbocharger. In one example, the speed of rotation of the electric booster during the diagnostics routine may be 2500 RPM. By operating the electric booster at a lower speed, power consumption may be reduced and noise generation during operation of the electric booster may also be reduced. The compressed air may flow into the first intake cylinder via the open intake valve.

At 414, the controller may retrieve a baseline airflow from an on-board database in the controller memory. In one example, the baseline airflow may be estimated via a differential pressure sensor (such as pressure sensor 127 in FIG. 1) coupled across an exhaust particulate filter upon installation or servicing of the engine cylinders at the manufacturing facility or a service station by flowing pressurized air through the first cylinder during a vehicle key-off condition when the first cylinder is parked in the first position (intake valve open and exhaust valve closed). During establishing the baseline airflow, the electric booster may be rotated at 2500 RPM. Upon installation or servicing of the engine cylinders, the exhaust valve may not be degraded. The compressed air may enter the cylinder through the open intake valve but may not flow out of the cylinder via the closed exhaust valve, thereby registering a lower amount of exhaust airflow (intake valves of other cylinders are closed, hence no airflow through any of the cylinders) at the exhaust pressure sensor. In one example, the baseline airflow may be zero. In another example, the intake and exhaust valves of other cylinders may be in an overlapping position (partially open), thereby causing a non-zero baseline (exhaust) airflow.

The baseline airflow may be estimated within a threshold duration since installation or servicing of the cylinder. In one example, the threshold duration may be one day since the installation or servicing of the cylinder. Alternatively, the baseline airflow may be estimated within a first threshold distance of travel (of the vehicle) since installation or servicing of the cylinder. In one example, the threshold distance may be 30 miles since the installation or servicing of the cylinder.

At 416, airflow through the exhaust passage may be estimated via the differential pressure sensor coupled across the exhaust particulate filter. At 418, the estimated exhaust airflow may be compared to the baseline airflow. At 420, the routine includes determining if the estimated exhaust airflow is higher than the baseline airflow. As the intake valve of only the first cylinder is open, the compressed air from the electric booster may enter the first cylinder but due to the closed exhaust valve may not flow out of the cylinder. Therefore, if the exhaust valve is not degraded there may not be any substantial airflow through the exhaust passage and the exhaust airflow may be substantially equal (such as within 5% of the baseline airflow) to the baseline airflow.

If it is determined that the exhaust airflow is higher than the baseline airflow, it may be inferred that the exhaust valve is leaking and the pressurized air entering the cylinder may have escaped through the exhaust valve even when it is actuated to a closed position. Therefore, at 422, a diagnostic code (flag) may be set indicating that the exhaust valve is degraded such as leaking. The exhaust valve may have become loaded with carbon buildup, which may in some examples cause the exhaust valve to be stuck in at least a partially open position causing the compressed air to flow to the exhaust passage via the cylinder.

If it is determined that the exhaust airflow is not higher than the baseline airflow, it may be inferred that the exhaust airflow is substantially equal to the baseline airflow (such as within 5% of the baseline airflow) and the compressed air may not be able to flow through the closed exhaust passage. Therefore, at 424, it may be indicated that the exhaust valve is not degraded (such as not leaking) and may be actuated to a completely closed position.

In one example, even if one cylinder (first cylinder) is identified (such in the cylinder power balance test) to deliver a lower than threshold power and a diagnostic routine is carried out for the exhaust valve coupled to the first cylinder, the controller may selectively carry out the exhaust valve diagnostics on the remaining engine cylinders to detect if any other exhaust valve is degraded. In another example, an engine may not be equipped to carry out on-board diagnostics such as the cylinder power balance tests and in response to indications of combustion instability such as a misfire, the controller may carry out diagnostics of each cylinder in the misfiring cylinder bank or each engine cylinder one after the other. Therefore, if it is detected that the exhaust valve coupled to the first cylinder is degraded or if it is detected that the exhaust valve coupled to the first cylinder is not degraded, the controller may proceed to diagnose the exhaust valve coupled to the cylinder immediately next to the first cylinder.

At 426, the routine includes determining if the exhaust valves of each engine cylinder has been tested (diagnosed). If it is detected that the exhaust valve of each cylinder has not yet been tested, at 428, the controller may send a signal to the actuator coupled to the starter motor to rotate the engine unfueled using power from an on-board battery or electric machine. The engine is rotated and the cylinder (second cylinder) immediately subsequent to the cylinder (first cylinder) which is last diagnosed for exhaust valve degradation is parked in the first position with the intake valve open and the exhaust valve closed. Once the second cylinder is parked in the first position, the operation of the starter motor may be suspended.

The routine may then proceed to step 416 and the diagnostics of the exhaust valve coupled to second cylinder may be carried out. In this way, the controller may carry out the diagnostics of each exhaust valve, one at a time. Once it is determined in step 426 that exhaust valves of each cylinder has been tested, at 430, the diagnostic routine for exhaust valves is completed and the electric booster may no longer be rotated. The controller may send a signal to the electric booster actuator to stop rotating the engine and the engine may be returned to a shutdown condition.

If it is detected that one or more exhaust valves are degraded, such as leaking, at 432, during subsequent engine operations, one or more engine operating parameters may be adjusted to account for the degraded exhaust valves. In one example, an exhaust valve degradation flag may be set to stop fuel flow and spark to the cylinder experiencing valve degradation. In another example, if the engine is a variable displacement engine, the cylinder may be deactivated during predetermined engine operating conditions, and variable displacement control methods adjusted accordingly.

In this way, during a first condition, including an engine-off condition, compressed air may be forced into a first cylinder of a multi cylinder engine while maintaining an intake valve of the first cylinder open and an exhaust valve of the first cylinder closed, and degradation of the first cylinder may be indicated responsive to a higher than threshold airflow through an exhaust coupled to the first cylinder.

FIG. 6 shows an example timeline 600 of engine positions during the exhaust valve diagnostics routine of a four cylinder. The horizontal (x-axis) denotes time and the vertical markers t1-t5 identify significant times in the exhaust valve diagnostic routine. The different positions of a first engine cylinder during the entire diagnostic routine is shown in row 602. The different positions of a second engine cylinder during the entire diagnostic routine is shown in row 604, the second cylinder positioned immediately next to the first cylinder in the engine clock. The different positions of a third engine cylinder during the entire diagnostic routine is shown in row 606, the third cylinder positioned immediately next to the second cylinder in the engine clock. The different positions of a fourth engine cylinder during the entire diagnostic routine is shown in row 608, the fourth cylinder positioned immediately next to the third cylinder in the engine clock.

Exhaust valve diagnostics may be initiated at time t1 for the first cylinder, cylinder 1 and the diagnostics is carried out between time t1 and t2. During this time (between time t1 and t2), the first cylinder is parked in the intake stroke position with its intake valve open and the exhaust valve closed. During the diagnostics of the first cylinder, the second cylinder is parked in a compression stroke with both its intake and exhaust valves in closed positions. The third cylinder is parked in a power stroke with both its intake and exhaust valves in closed positions. The fourth cylinder is parked in an exhaust stroke with its intake valve in a closed position and the exhaust valve in an open position.

At time t2, the diagnostics of the exhaust valve coupled to the first cylinder is completed and the engine is rotated unfueled to park the second cylinder in the intake stroke position. Between time t2 and t3, the second cylinder is parked in the intake stroke position with its intake valve open and the exhaust valve closed and the diagnostics of the exhaust valve (of the second cylinder) is carried out. During the diagnostics of the second cylinder, the first cylinder is parked in an exhaust stroke with its intake valve in a closed position and the exhaust valve in an open position. The third cylinder is parked in a compression stroke with both its intake and exhaust valves in closed positions. The fourth cylinder is parked in a power stroke with both its intake and exhaust valves in closed positions.

At time t3, the diagnostics of the exhaust valve coupled to the second cylinder is completed and the engine is rotated unfueled to park the third cylinder in the intake stroke position. Between time t3 and t4, the second cylinder is parked in the intake stroke position with its intake valve open and the exhaust valve closed and the diagnostics of the exhaust valve (of the second cylinder) is carried out. During the diagnostics of the second cylinder, the first cylinder is parked in an exhaust stroke with its intake valve in a closed position and the exhaust valve in an open position. The third cylinder is parked in a compression stroke with both its intake and exhaust valves in closed positions. The fourth cylinder is parked in a power stroke with both its intake and exhaust valves in closed positions.

At time t4, the diagnostics of the exhaust valve coupled to the third cylinder is completed and the engine is rotated unfueled to park the fourth cylinder in the intake stroke position. Between time t4 and t5, the fourth cylinder is parked in the intake stroke position with its intake valve open and the exhaust valve closed and the diagnostics of the exhaust valve (of the second cylinder) is carried out. During the diagnostics of the fourth cylinder, the first cylinder is parked in a compression stroke with both its intake and exhaust valves in closed positions. The second cylinder is parked in a power stroke with both its intake and exhaust valves in closed positions. The third cylinder is parked in an exhaust stroke with its intake valve in a closed position and the exhaust valve in an open position. At time t5 diagnostics of each of the exhaust valves coupled to engine cylinders is completed.

FIG. 7 shows an example timeline 700 illustrating diagnostics of an exhaust valve (such as exhaust valve 250 in FIG. 2) coupled to a first engine cylinder of a four cylinder engine. The first cylinder also includes an intake valve (such as intake valve 256 in FIG. 2). The exhaust valve is actuated via an exhaust cam actuator coupled to the exhaust valve and the intake valve is actuated via an intake cam actuator coupled to the intake valve. The horizontal (x-axis) denotes time and the vertical markers t1-t4 identify significant times in the exhaust valve diagnostic routine.

The first plot, line 701, shows position of an accelerator pedal as estimated via a pedal position sensor. The second plot, line 702, shows variation in vehicle speed over time. The third plot, line 704, shows a speed of operation of an electric booster (such as electric booster 155) in FIG. 1. The fourth plot, line 706, shows a position of the exhaust valve. The fifth plot, line 708, shows a position of the intake valve. The sixth plot, line 710, shows exhaust airflow as estimated via a differential pressure sensor (such as pressure sensor 127 in FIG. 1) coupled across an exhaust particulate filter. Dashed line 712 shows a baseline exhaust airflow. The baseline airflow is established upon installation of the exhaust valve by routing compressed air through the engine cylinder with the intake valve open and the exhaust valve closed, the baseline airflow estimated via the differential pressure sensor. The seventh plot, dotted 716, show a flag indicating degradation of the exhaust valve.

Prior to time t1, the vehicle is propelled using engine torque. The torque demand as estimated based on the pedal position remains substantially constant and electric booster is operated to provide the desired boost pressure. The position of the exhaust valve changes from an open position to a closed position as the engine cycle continues and the cylinder position changes from the exhaust stroke to the intake stroke. Similarly, the position of the intake valve changes from closed to open based on the cylinder position (stroke). The differential pressure (dP) sensor reading is representative of the exhaust flow through the particulate filter. Since degradation of the exhaust valve is not detected, the flag is maintained in the off state.

At time t1, in response to a tip-out, it is inferred that the vehicle will come to a stop (keyed-off) at time t2. As the torque demand decreases, the electric booster is actuated to an off position. Between time t1 and t2, the intake cam actuator is actuated to open the intake valve coupled to the first cylinder (such as in the intake stroke) and maintain the intake valve in the open position when the engine stops rotating. As the intake valve of the first cylinder is opened, the intake valves coupled to each of the remaining cylinders are maintained in closed positions. The exhaust cam actuator is actuated to close the exhaust valve coupled to the first cylinder (such as in the intake stroke) and maintain the exhaust valve in the closed position when the engine stops rotating.

At time t2, the vehicle is stopped (keyed-off). As engine torque is no longer desired for vehicle operation, the electric booster operation is also stopped. Between time t2 and t3, the vehicle is not propelled using engine torque and/or machine torque. As the vehicle is not operated, the engine is non combusting and exhaust no longer flows through the exhaust manifold and the exhaust differential pressure sensor reading reduces to zero.

At time t3, after a threshold duration has elapsed since the vehicle key-off (the duration between time t2 and t3), exhaust valve diagnostic is initiated. The controller sends a signal to the electric booster actuator to rotate the electric booster. During the diagnostic routine, the electric booster is operated at a speed lower than the speed at which the electric booster is rotated to provide boost (such as prior to time t1). Between time t3 and t4, the compressed air from the electric booster is routed to enter the first cylinder via the open intake valve but the compressed air cannot flow through the first cylinder as the exhaust valve is closed. The exhaust airflow is substantially equal to the baseline airflow 712. Therefore, it is inferred that the exhaust valve of the first cylinder could be actuated to the commanded (closed) position and the valve is not leaking.

However, if it was observed that between t3 and t4, the exhaust airflow (dP sensor reading) is higher than the baseline airflow, it would have indicated that the exhaust valve is leaking and even when it is commanded to be closed, air is flowing from the engine intake to the exhaust through the cylinder. In response to the higher than baseline 712 airflow, between time t3 and t4, the flag 716 denoting that the exhaust valve is stuck open would have been raised and a diagnostic code would have been set.

At time t4, the diagnostic routine is completed. The controller sends a signal to the electric booster actuator to stop rotating the electric booster. After time t4, the vehicle is maintained in the keyed-off condition and the electric motor is not rotated.

In this way, by carrying out diagnostics of the exhaust valve during engine-off conditions, it is possible to differentiate exhaust valve degradation from any other factor adversely affecting engine performance. Also, by carrying out the diagnostics during the key-off condition, the position of the engine valves may be adjusted to improve the diagnostic routine. The technical effect of using existing engine components such as electric booster and a differential pressure sensor is that the diagnostic routine may be carried out on-board without external intervention. By detecting a degradation of the exhaust valve at an earlier stage, it is possible to stop further damage to the exhaust valve caused by prolonged carbon deposition. Overall, by regularly monitoring the health of exhaust valves, combustion stability, engine performance, and fuel efficiency may be improved.

An example method comprises: testing for degradation of an exhaust valve coupled to a cylinder of a multi cylinder engine, which drives a vehicle, by sealing the exhaust valve during an on-board test, routing compressed air into the cylinder during the test, and indicating presence or absence of degradation of the exhaust valve during the test based on an airflow through an exhaust coupled to the cylinders relative to a baseline airflow through the exhaust. In any preceding example, additionally or optionally, the testing is carried out while the engine is not combusting fuel and wherein the vehicle is an autonomous vehicle and/or a hybrid vehicle. In any or all of the preceding examples, additionally or optionally, sealing the exhaust valve includes positioning the cylinder in a first position with an intake valve, coupled to the cylinder, in an open position and the exhaust valve in a closed position. In any or all of the preceding examples, additionally or optionally, routing the compressed air includes routing compressed air from an engine intake into the cylinder by operating an electric booster via an electric motor. In any or all of the preceding examples, additionally or optionally, indicating the presence of the degradation includes, estimating an exhaust airflow, and indicating that the exhaust valve is degraded responsive to the estimated exhaust airflow being higher than the baseline airflow. In any or all of the preceding examples, additionally or optionally, indicating the absence of the degradation includes, indicating that the exhaust valve is not degraded responsive to the estimated exhaust airflow being substantially equal to the baseline airflow. In any or all of the preceding examples, additionally or optionally, the exhaust airflow is estimated via a differential pressure sensor coupled across an exhaust particulate filter, the exhaust particulate filter coupled to the engine exhaust downstream of the cylinder. In any or all of the preceding examples, additionally or optionally, the baseline airflow is established upon installation of the exhaust valve in the cylinder by routing compressed air through the cylinder with the intake valve open and the exhaust valve closed and estimating exhaust airflow via the differential pressure sensor. In any or all of the preceding examples, the method further comprises, additionally or optionally, after indicating presence or absence of degradation of the exhaust valve coupled to the cylinder, rotating the engine unfueled, positioning another cylinder in the first position, and testing for degradation of an exhaust valve coupled to the other cylinder. In any or all of the preceding examples, additionally or optionally, the electric booster is coupled to a conduit parallel to an intake passage, the conduit coupled to the intake passage downstream of an intake compressor and upstream of a charge air cooler. In any or all of the preceding examples, the method further comprises, additionally or optionally, during an immediately subsequent engine operation, in response to indication of a degraded exhaust valve, suspending fueling and spark to the cylinder with the degraded exhaust valve.

Another method for an engine comprises: during a first condition, including an engine-off condition, forcing compressed air into a first cylinder of a multi cylinder engine while maintaining an intake valve of the first cylinder open and an exhaust valve of the first cylinder closed, and indicating degradation of the first cylinder responsive to a higher than threshold airflow through an exhaust coupled to the first cylinder. In any preceding example, additionally or optionally, the first condition includes a power output of the first cylinder being lower than a threshold power output and wherein the engine propels a vehicle which comprises either an autonomous vehicle and/or a hybrid vehicle. In any or all of the preceding examples, additionally or optionally, the compressed air is forced from an engine intake into the first cylinder by operating an electric booster via an electric motor during the engine-off condition. In any or all of the preceding examples, additionally or optionally, the airflow through the exhaust is estimated via a differential pressure sensor coupled across a particulate filter housed in the exhaust. In any or all of the preceding examples, additionally or optionally, the power output of the first cylinder is estimated by selectively disabling spark to the first cylinder while maintaining spark to each remaining cylinders of the multi cylinder engine, estimating a change in engine speed via a crankshaft position sensor, and estimating the power output of the first cylinder based on the estimated change in the engine speed after disabling spark. In any or all of the preceding examples, the method further comprises, additionally or optionally, establishing the threshold air via the differential pressure sensor upon installation of the first cylinder by operating the electric booster while maintaining the intake valve of the first cylinder open and the exhaust valve of the first cylinder closed.

In yet another example, a hybrid vehicle system comprises: a vehicle, including an autonomous vehicle and/or a hybrid vehicle, an engine propelling the vehicle, the engine including a first cylinder, an intake passage, and an exhaust passage, the first cylinder including an intake valve and an exhaust valve, the intake valve actuated via an intake cam actuation system and the exhaust valve actuated via an exhaust cam actuation system, a conduit coupled to the intake passage downstream of a compressor and upstream of a CAC, the conduit including a motor-driven electric booster, a particulate filter coupled to the exhaust passage, a differential pressure sensor coupled across the particulate filter, and a controller with computer readable instructions stored on non-transitory memory for: during operation of the electric booster while the vehicle is in a keyed-off condition, commanding the intake cam actuation system and the exhaust cam actuation system to park the first cylinder in a first position with the intake valve open and the exhaust valve closed, sensing exhaust airflow in the exhaust passage via the differential pressure sensor after the commanded parking of the first cylinder, and indicating that the exhaust valve is leaking in response to the sensed exhaust airflow being higher than a threshold airflow. In any preceding example, additionally or optionally, parking the first cylinder in the first position includes commanding a starter motor coupled to a crankshaft of the first cylinder to rotate the first cylinder until the first cylinder reaches the first position, the starter motor operated via an electric machine. In any or all of the preceding examples, additionally or optionally, the controller includes further instructions for: in response to the indicating that the exhaust valve is leaking, during an immediately subsequent engine cycle, suspending fuel injection to the first cylinder via one or more fuel injectors coupled to the first cylinder and disabling spark to the first cylinder via a spark plug coupled to the first cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising:
    testing for degradation of an exhaust valve coupled to a cylinder of a multi cylinder engine, which drives a vehicle, by sealing the exhaust valve during an on-board test;
    routing compressed air into the cylinder during the test; and
    indicating presence or absence of degradation of the exhaust valve during the test based on an airflow through an exhaust coupled to the cylinders relative to a baseline airflow through the exhaust.
2. The method of claim 1, wherein the testing is carried out while the engine is not combusting fuel and wherein the vehicle is an autonomous vehicle and/or a hybrid vehicle.
3. The method of claim 1, wherein sealing the exhaust valve includes positioning the cylinder in a first position with an intake valve, coupled to the cylinder, in an open position and the exhaust valve in a closed position.
4. The method of claim 1, wherein routing the compressed air includes routing compressed air from an engine intake into the cylinder by operating an electric booster via an electric motor.
5. The method of claim 1, wherein indicating the presence of the degradation includes, estimating an exhaust airflow, and indicating that the exhaust valve is degraded responsive to the estimated exhaust airflow being higher than the baseline airflow.
6. The method of claim 5, wherein indicating the absence of the degradation includes, indicating that the exhaust valve is not degraded responsive to the estimated exhaust airflow being substantially equal to the baseline airflow.
7. The method of claim 5, wherein the exhaust airflow is estimated via a differential pressure sensor coupled across an exhaust particulate filter, the exhaust particulate filter coupled to the engine exhaust downstream of the cylinder.
8. The method of 7, wherein the baseline airflow is established upon installation of the exhaust valve in the cylinder by routing compressed air through the cylinder with the intake valve open and the exhaust valve closed and estimating exhaust airflow via the differential pressure sensor.
9. The method of claim 3, further comprising, after indicating presence or absence of degradation of the exhaust valve coupled to the cylinder, rotating the engine unfueled, positioning another cylinder in the first position, and testing for degradation of an exhaust valve coupled to the other cylinder.
10. The method of claim 4, wherein the electric booster is coupled to a conduit parallel to an intake passage, the conduit coupled to the intake passage downstream of an intake compressor and upstream of a charge air cooler.
11. The method of claim 1, further comprising, during an immediately subsequent engine operation, in response to indication of a degraded exhaust valve, suspending fueling and spark to a cylinder with the degraded exhaust valve.
12. An engine method, comprising:
    during a first condition, including an engine-off condition, forcing compressed air into a first cylinder of a multi cylinder engine while maintaining an intake valve of the first cylinder open and an exhaust valve of the first cylinder closed; and
    indicating degradation of the first cylinder responsive to a higher than threshold airflow through an exhaust coupled to the first cylinder.
13. The method of claim 12, wherein the first condition includes a power output of the first cylinder being lower than a threshold power output and wherein the engine propels a vehicle which comprises either an autonomous vehicle and/or a hybrid vehicle.
14. The method of claim 12, wherein the compressed air is forced from an engine intake into the first cylinder by operating an electric booster via an electric motor during the engine-off condition.
15. The method of claim 12, wherein the airflow through the exhaust is estimated via a differential pressure sensor coupled across a particulate filter housed in the exhaust.

16. The method of claim 13, wherein the power output of the first cylinder is estimated by selectively disabling spark to the first cylinder while maintaining spark to each remaining cylinders of the multi cylinder engine, estimating a change in engine speed via a crankshaft position sensor, and estimating the power output of the first cylinder based on the estimated change in the engine speed after disabling spark.

17. The method of claim 12, further comprising, establishing the threshold airflow via the differential pressure sensor upon installation of the first cylinder by operating the electric booster while maintaining the intake valve of the first cylinder open and the exhaust valve of the first cylinder closed.

18. A system, comprising:
 a vehicle, including an autonomous vehicle and/or a hybrid vehicle;
 an engine propelling the vehicle, the engine including a first cylinder, an intake passage, and an exhaust passage, the first cylinder including an intake valve and an exhaust valve, the intake valve actuated via an intake cam actuation system and the exhaust valve actuated via an exhaust cam actuation system;
 a conduit coupled to the intake passage downstream of a compressor and upstream of a CAC, the conduit including a motor-driven electric booster;
 a particulate filter coupled to the exhaust passage;
 a differential pressure sensor coupled across the particulate filter; and
 a controller with computer readable instructions stored on non-transitory memory for:
  during operation of the electric booster while the vehicle is in a keyed-off condition,
  commanding the intake cam actuation system and the exhaust cam actuation system to park the first cylinder in a first position with the intake valve open and the exhaust valve closed;
  sensing exhaust airflow in the exhaust passage via the differential pressure sensor after the commanded parking of the first cylinder; and
  indicating that the exhaust valve is leaking in response to the sensed exhaust airflow being higher than a threshold airflow.

19. The system of claim 18, wherein parking the first cylinder in the first position includes commanding a motor coupled to a crankshaft of the first cylinder to rotate the first cylinder until the first cylinder reaches the first position, the motor operated via an electric machine.

20. The system of claim 18, wherein the controller includes further instructions for: in response to the indicating that the exhaust valve is leaking, during an immediately subsequent engine cycle, suspending fuel injection to the first cylinder via one or more fuel injectors coupled to the first cylinder and disabling spark to the first cylinder via a spark plug coupled to the first cylinder.

* * * * *